United States Patent [19]
Fujimura et al.

[11] Patent Number: 4,910,536
[45] Date of Patent: Mar. 20, 1990

[54] ELECTROPHOTOGRAPHIC PHOTOSENSITIVE MEMBER, ELECTROPHOTOGRAPHIC APPARATUS AND PROCESS FOR FORMING AN ELECTROPHOTOGRAPHIC IMAGE USING LASER AND SPECIAL ORGANIC PHOTOCONDUCTOR

[75] Inventors: Naoto Fujimura, Yokohama; Masami Okunuki, Tokyo; Teigo Sakakibara, Yokohama; Noboru Kashimura, Kawasaki, all of Japan

[73] Assignee: Canon Kabushiki Kaisha, Tokyo, Japan

[21] Appl. No.: 165,096

[22] Filed: Mar. 7, 1988

[30] Foreign Application Priority Data

Mar. 13, 1987 [JP] Japan ................................ 62-58315

[51] Int. Cl.[4] .............................................. G01D 15/14
[52] U.S. Cl. .................................... 346/160; 430/945; 430/58; 430/73; 430/76
[58] Field of Search .................. 346/160; 430/945, 58

[56] References Cited

U.S. PATENT DOCUMENTS 4,387,149 6/1983 Emoto et al. ......................... 430/83
4,754,294 6/1988 Kato ................................. 346/160

*Primary Examiner*—J. David Welsh
*Attorney, Agent, or Firm*—Fitzpatrick, Cella, Harper & Scinto

[57] ABSTRACT

An electrophotographic apparatus comprises at least a charging means, an imagewise exposure means with a laser beam having a spot diameter of 100 um or less, a developing means, a transferring means and a cleaning means arranged around an electrophotographic photosensitive member, and said electrophotographic photosensitive member comprises a charge generation material and a charge transport material comprising an organic photoconductive material and has a surface layer containing said charge transport material, wherein the absorption end of visible to UV spectroscopic absorption of the surface layer is substantially unchanged by exposure to nitric acid vapor for 10 minutes; an electrophotographic image forming process; and an electrophotographic photosensitive member.

9 Claims, 6 Drawing Sheets

ELECTROPHOTOGRAPHIC PHOTOSENSITIVE MEMBER, ELECTROPHOTOGRAPHIC APPARATUS AND PROCESS FOR FORMING AN ELECTROPHOTOGRAPHIC IMAGE USING LASER AND SPECIAL ORGANIC PHOTOCONDUCTOR

BACKGROUND OF THE INVENTION

1. Field of the Invention

This invention relates to an electrophotographic photosensitive member to be applied for, particularly, the so called laser copying machine, laser color copying machine and laser printer for obtaining a copied image of high gradation degree which is 100 μm or less in spot diameter of laser and obtained by performing reproduction of half tone in the technical field in which image formation is effected with laser beam.

Also, the present invention relates to an electrophotographic photosensitive member which comprises performing reproduction of half tone by varying the laser dose in two or more stages.

Further, the present invention relates to an electrophotographic photosensitive member to be applied for a higher gradation, higher image quality laser copying machine, laser color copying machine and laser printer, which comprises performing reproduction of half tone by varying the pulse wave width of laser beam (PMW method).

2. Related Background Art

In the electrophotographic devices of the prior art, the so called analog system was predominant, which performed latent image formation by irradiating a light source in general such as halogen light, fluorescent light on a manuscript and irradiating the reflected light on an electrophotographic photosensitive member (image exposure).

On the other hand, it is well known in the art that with the progress of development of the so called digital system electrophotographic device by use of laser beam, LED beam, liquid crystal shutter, etc. as the light source, the laser beam printer has not assumed dominance as demanded from the printers for computer, facsimile, etc.

Above all, quite recently, by use of a digital light source such as laser, etc., as further advanced from the line printer of the prior art, research and developments have been actively performed regarding a laser copying machine for performing image copying.

The greatest difference between laser copying machine and laser beam printer resides in gradation reproducibility. Since copying of photography or image is performed in a laser copying machine, high half tone reproduction, high image quality and high resolution are demanded. For reproduction of half tone, it is performed by increase or decrease of number of dots, but according to this system, there is a limit in gradation reproduction, and also coarseness, etc. are conspicuous on image quality. Photographic copying of high image quality and high resolution cannot be obtained under the present state of the art.

For obtaining half tone of high quality by solving such problems, there are three means as shown below.

The first means is to narrow the laser spot diameter, thereby increasing previously the dot number. In the prior art, 240 dpi was primarily employed, but 300, 400 dpi are becoming more popular in recent years. Accordingly, the laser spot diameter, which was previously 120 μm or more, is now becoming 100 μm or less, particularly 70 μm or less.

The second means is to reproduce half tone by varying the laser quantity in two or more stages. Practically, it is difficult to obtain a high degree of half tone only by quantity change, and it is frequently practiced to use this means in combination with the first means for changing the dot number.

The spot diameter as herein mentioned is represented by the width with the height of $1/e^2$ for the peak value of the laser emission distribution showing a Gaussian distribution. When the cross-section of the spot is not completely spherical, it is defined as the maximum diameter.

The third means is the PWM (Pulse Width Modulation) system. As contrasted to the system of the prior art which performs reproduction of half tone by increase and decrease of dot number (FIG. 1A), a new system for obtaining a copy of high gradation, high image quality is by laser modulation of the PWM system as already disclosed by the present applicant in Japanese patent application No. 190659/1986. That system is going to be newly developed.

In essence, the PWM system is a technique to reproduce half tone by varying the size (laser spot diameter) of a dot without varying the dot number as shown in FIG. 1B. According to this system, high gradation similar to analog image can be obtained for the first time, and also it has become possible to obtain a copy of high quality without coarseness.

A laser copying machine of the PWM system can exhibit its effect in copying of photographs, and it is a particularly effective technique in a laser color copying machine. Also, it has not only reached a level comparable to the analog system in image quality, but also has a number of excellent copying characteristics, correction of image quality and tone, control, conversion, transfer, various editing functions, etc.

As a matter of course, this system is applicable also for a laser beam printer which can also effect reproduction of half tone in place of a laser beam printer as the line printer of the prior art.

As a photosensitive member for electrophotography, inorganic photoconductive members such as of silicon, selenium, cadmium sulfide, zinc oxide, etc. have been heretofore known.

Further, since discovery of a specific compounds exhibiting photoconductivity, a large number of organic photoconductors have been developed. For example, there have been known organic photoconductive polymers such as poly-N-vinylcarbazole, polyvinylanthracene, etc., low molecular weight organic photoconductive materials such as carbazole, anthracene, pyrazolines, oxadiazoles, hydrazones, polyarylalkanes, etc., organic pigments and dyes such as phthalocyanine pigments, azo pigments, cyanine dyes, polycyclic quinone pigments, perylene type pigments, indigo dyes, thioindigo dyes or squaric acid methine dyes, etc. Particularly, since organic pigments and dyes have photoconductivity can be synthesized more easily as compared with inorganic materials, and yet expanded in variation to select compounds exhibiting photoconductivity in appropriate wavelength regions, a large number of photoconductive pigments and dyes have been proposed. For example, there have been known electrophotographic photosensitive members by use of disazo pigment exhibiting photoconductivity as the charge generation substance in the photosensitive layer separated into the functions of charge generation layer and charge transport layer as disclosed in U.S. Pat. Nos. 4,123,270, 4,247,614, 4,251,614, 4,256,821, 4,260,672, 4,268,596, 4,278,747, 4,279,981, 4,293,628, 4,356,243, 4,436,800, 4,471,040, 4,582,771, etc.

An electrophotographic photosensitive member by use of such organic photoconductors can be produced by coating, and therefore is very high in productivity and can provide inexpensive photosensitive members, and also has the advantage of controlling freely the photosensitive wavelength region by selection of the organic pigment.

Among them, a laminated type photosensitive member obtained by lamination of a charge transport layer and a charge generation layer composed mainly of a charge generation material is more excellent in residual potential, memory, repeated characteristic, etc. than other simple layer type photosensitive member, and has the advantage particularly in improvement of sensitivity.

In recent years, organic photoconductive members have not only reached a level comparable with high sensitivity inorganic photosensitive member such as a-Se, a-Si, etc. at least in aspect of sensitivity, but also some of them have already surpassed inorganic photoconductive members in sensitivity particularly in the wavelength region (770–800 nm) of the solid laser light source generally employed today.

For the reasons as mentioned above, for electrophotographic devices by use of laser beam, organic photoconductors tend to be increasingly used year by year.

However, when an organic photoconductor is used in an electrophotographic apparatus by use of a laser capable of reproducing half tone, particularly an electrophotographic apparatus by employment of the PWM system (copying machine particularly color copying machine, printer capable of reproducing half tone), there is a substantial problem not found in the prior art, which has become an obstacle in practical application.

When an organic photosensitive member is set on a laser color copying system of the reversal developing system, the photosensitive member is stopped after completion of copying and left to stand for a while, the portion corresponding to that immediately below the corona charger is damaged, and there is generated a phenomenon that the image corresponding to that site is dropped out in white on copying.

This phenomenon was found to be very marked in the case of an electrophotographic apparatus using a laser as the light source in which importance is attached to reproduction of half tone, further a laser color copying machine in which reproduction of the image at the low contrast site (highlight portion) is demanded, particularly a copying machine or color copying machine of the PWM system, and above all a laser color copying machine in which copying is effected by repeating developing for 4 times and synchronizing the position of the photosensitive drum with the image exposure position. Further, it was also found that white drop-out became more marked as the progress of successive copying progressed to the extent that the desired image was unavailable.

SUMMARY OF THE INVENTION

An object of the present invention is to provide an electrophotographic photosensitive member adapted for a laser electrophotographic process capable of effecting reproduction of half tone, which has overcome such difficulties, having excellent durability as well as high image quality and high gradation characteristic, and an electrophotographic apparatus and a process for forming an electrophotographic image.

Another object of the present invention is to provide an electrophotographic photosensitive member adapted for a laser electrophotographic process of the PWM system capable of effecting reproduction of half tone, which has further higher high image quality and higher gradation characteristic and an electrophotographic apparatus and a process for forming an electrophotographic image.

A further object of the present invention is to provide an electrophotographic photosensitive member having high image quality and high durability, which is adapted for a laser electrophotographic process which performs color copying by carrying out 3 times or more of developing by use of at least 3 colors or more, and an electrophotographic apparatus and a process for forming an electrophotographic image.

As the result of investigation of image white drop-out immediately under a charger as described above, it has been found that this phenomenon is a phenomenon inherent in digital image formation of high image quality, particularly a charging device utilizing laser modulation and corona discharging according to the PWM system or discharging in air, and is immensely concerned with the specific characteristic of the charge transport material contained in the organic photoconductive member.

Further, the present invention is an electrophotographic photosensitive member to be used in an electrophotographic process in which image formation capable of reproducing half tone is effected by carrying out at least charging, image exposure with a laser beam a having a spot diameter of 100 μm or less, particularly 70 μm or less, development and transfer, comprising an electrophotographic photosensitive member containing a charge generation material and a charge transport material, and the absorption end of visible to UV spectroscopic absorption of the surface layer containing said charge transport layer being substantially unchanged by exposure to nitric acid vapor for 10 minutes.

DESCRIPTION OF THE PREFERRED EMBODIMENTS

Corona discharging, as is well known in the art, is a system in which uniform charging is effected on a photosensitive member by ionizing gaseous molecules in the air by application of a high voltage, and will generate by $O_3$, NOx or ions thereof and the so called corona products formed by the reaction of these with various molecules in the air.

While the corona products would function in various manners respectively, it has been found that $HNO_3$ is present as an effective component thereof. Although the mechanism for formation of $HNO_3$ has not been intensively sought after, it may be considered without problem to be generated through the reactions of NOx, $O_3$ and $H_2O$.

Figure 1A:
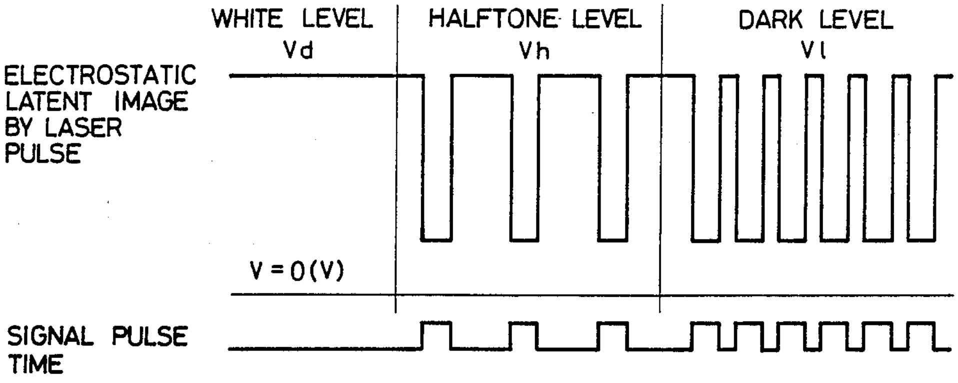
FIGS. 1A and 1B represents a reproduction system of half tone, FIG. 1A being the prior art system of modulation by increase and decrease of number of signal pulses, FIG. 1B being the PWM system of modulation by increase and decrease of pulse time, in which spot diameter of laser beam is varied, with a constant number of signal pulses.
Figure 1B:
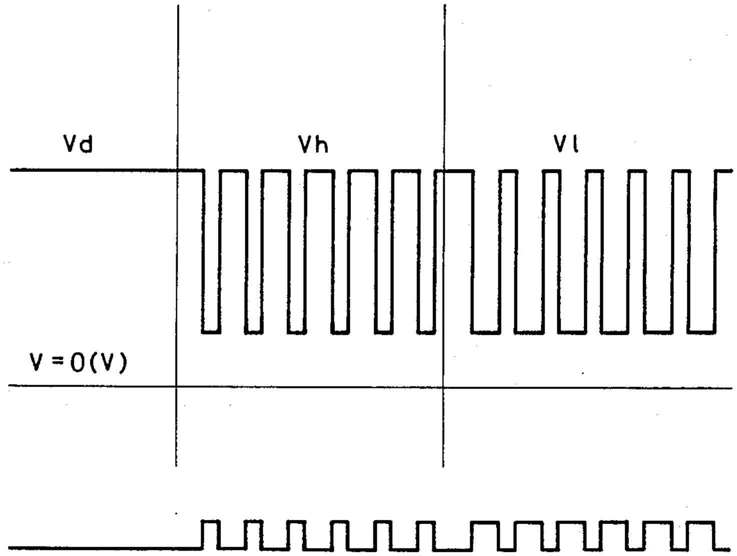
Figure 2A:
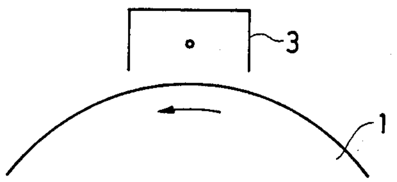
FIGS. 2A, 2B and 2C illustrate the mechanism of generation of image white drop-out.
Figure 2B:
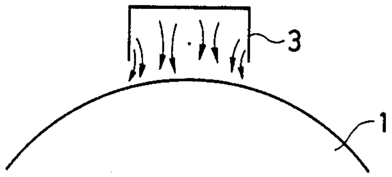
Figure 2C:
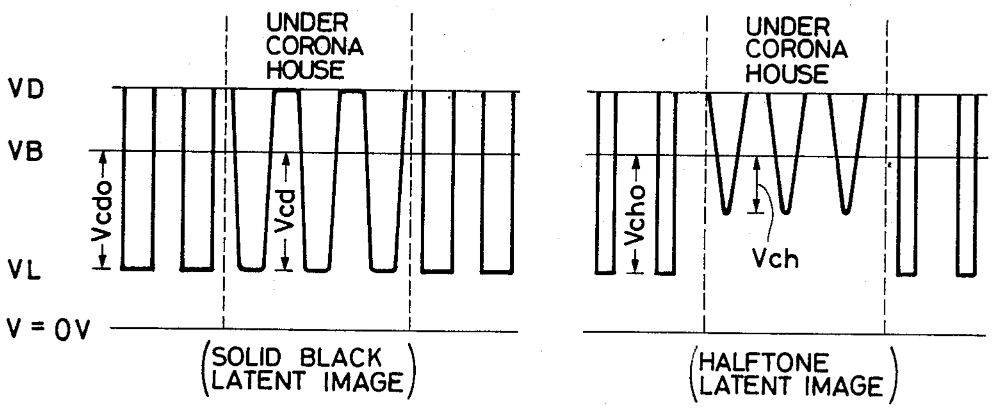

FIGS. 2A, 2B and 2C represent the generation mechanism of image white drop-out, in which $HNO_3$ participates. In FIG. 2A during copying actuation, $HNO_3$ is generated in addition to NOx, $O_3$, to be attached on the inner wall of corona house or housing, etc. In FIG. 2B by being left to stand for a long time during stopping, $HNO_3$ present on the inner wall within the corona house flies to the photosensitive member immediately below the house, and reacts gradually with the charge transport material in the surface layer, whereby the charge retentive ability of the surface is slightly lowered to make the surface one of low resistance. In FIG. 2C a fine digital latent image, particularly extremely fine digital latent image modulated with PWM is disturbed. In the drawing, when the spot width of the latent image is broad, the effect of surface resistance lowering is small (left Figure). That is, although an electric pattern on the photosensitive member moves to a side direction (portion having no charge) by making the surface of low resistance, the dark contrast Vcd on the exposure portion immediately below the corona house shows substantially the same value as the dark contrast Vcdo on the non-exposure portion other than the portion immediately below the corona house, and therefore, electrostatic latent image is barely influenced. On the contrary, as shown in the right Figure, in case spot width is narrowed to form a half tone latent image, the effect of surface resistance lowering is remarkable. That is, when the electric pattern moves to the side direction, since the spot width is narrow, half contrast Vch on the exposure portion immediately below the corona house is remarkably influenced, and thereby, the contrast is lowered substantially as compared with the half contrast Vcho on the non-exposure portion to give rise to the image white drop-out in the image of half tone as compared with the surroundings. This Figure shows an example of a reversal developing system, $V_D$ (dark portion potential) exhibiting the white portion, $V_L$ (light portion potential) the dark portion, $V_B$ developing bias. The practical digital latent image is not rectangular but has a shape approximate to Gaussian distribution, but here it is drawn as simplified.

The above explanation is a hypothesis based on our experiments, but it has been found as a fact that $HNO_3$ is accumulated on the shield inner wall by corona discharging, that $HNO_3$ migrates to the photosensitive member surface, that an image corresponding to the site of the photosensitive member left to stand immediately under the charger is subject to white drop-out as compared with the surroundings in an electrophotographic photosensitive member comprising an organic photoconductive member in an electrophotographic device which reproduced half tone through dot number change, quantity change by use of a laser light source with small beam diameter, particularly a laser electrophotographic apparatus by use of the PWM modulation system, particularly a laser color electrophotographic device in which developing at the highlight portion is performed. Also, it has been found that this phenomenon is not a problem at all in conventional analog copying machines, laser copying machines with spot diameters of 120 $\mu$ or more, etc.

It has been found that the image white drop-out phenomenon as described above depends greatly on the charge transport material contained in the photosensitive material. More specifically, as the result of investigation of various charge transport materials, there are materials with difficult generation of image white drop-out and materials with easy generation thereof, and further it has been found that its tendency cannot be classified clearly by way of the known demarcation such as oxidation potential, or hydrazone type, styryl type, etc.

Further, when the change in visible to UV absorption characteristics of the charge transport layer was examined by exposing the photosensitive member to $HNO_3$ detected by practical analysis, it has been found to be related to image white drop-out. We have attempted various analytical methods before reaching this conclusion, but no method for simple and correct evaluation of the change of the photosensitive layer with nitric acid could be found. Consequently, we paid attention to the property of the layer having a charge transport material which was changed in color from in yellow to red after exposure to nitric acid, as a convenient method for representing nitric resistance of the photosensitive layer, the visible to UV spectroscopic absorption measurement method has been adapted.

The relationship between the chemical change with nitric acid of the charge transport material and the spectroscopic absorption, image white drop-out has not yet been substantially clarified, but to date this method reflects very well the nitric acid resistance of the photosensitive member. We have investigated this phenomenon in more detail, and found that a photosensitive layer having nitric acid resistance of a certain level or higher will not generate image white drop-out. Also, while nitric acid resistance of the photosensitive layer is dominated by the characteristics of the charge transport material contained in the photosensitive layer, it has been also found that it is slightly influenced by the characteristics of the binder resin, the formulation ratio, etc.

Nitric acid resistance was evaluated under the conditions as specified below. A photosensitive member was cut into a size of 3 cm×5 cm to prepare a sample 15. Next, into a glass bottle 14 equipped with a lid of about 7 cm in diameter and a volume of 450 ml (e.g. produced by Hiroshima Glass Kogyo K.K., generally called mayonnaise bottle) is added 10 ml of 60% nitric acid 37 (not shown in figure), and said sample is sealed therein and left to stand at room temperature for 10 minutes. Then, measurement of the sample is performed by a visible to UV spectorophotometer, and the result is represented in terms of the amount of change in the absorption end of spectral absorption on the UV side.

The fact that the absorption end of visible to UV spectral absorption is substantially unchanged by exposure to nitric acid means that the amount of change of the absorption end wavelength is of 40 nm or less, preferably 30 nm or less before and after exposure to nitric acid, from the relationship with the white drop-out experiment of practical image.

Spectroscopic absorption measurement may be possible according to reflection system or transmission system, depending on the shape of the sample, but for determining the absorption end, it is determined by figure drawing from the graph representing the relationship between transmittance or reflectance and wavelength in linear scale. In this case, for the baseline, the value at which absorbance has reached saturation is employed (See, for example, FIGS. 5A and 5B).

The basic constitution of the electrophotographic photosensitive member in the present invention comprises an electroconductive substrate 31 and a photosensitive layer.

Figure 3A:
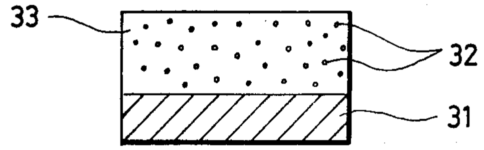
FIGS. 3A, 3B and 3C illustrate schematically the constitution of a photosensitive member.
Figure 3B:
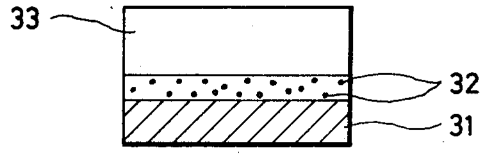
Figure 3C:
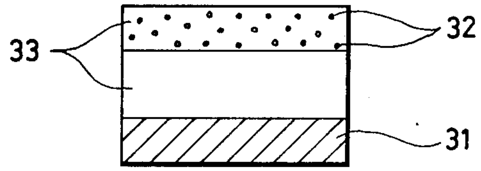
Figure 4:
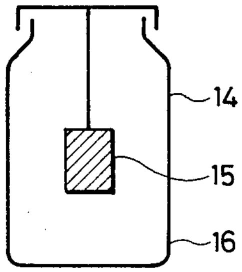
FIG. 4 illustrates schematically the nitric acid resistance test of a sample.

The photosensitive member is basically a single layer type(FIG. 3A) comprising charge generation material 32 and a charge transport material 33, a binder resin, but there may be also included the function separation type, in which the charge generation layer containing a charge generation material and the charge transport layer containing a charge transport material 33 are successively(FIG. 3B) or reversedly(FIG. 3C) laminated, etc. The charge transport material is dissolved so that it is not shown in FIGS. 3A, 3B and 3C.

The layer containing a charge transport layer as mentioned in the present invention is the photosensitive layer itself in the single layer type or charge transport layer in the successively laminated type, and also referrs to a charge transport material in the charge generation layer in the reversed layer type.

As the electroconductive substrate to be used in the present invention, various materials such as plastics, papers subjected to metal electroconductive treatment with various shapes such as sheet, belt, cylinder, rod, polyhedral column, etc. may be conceivable, but electroconductive substrates as shown below may be generally used.

For example, there may be employed aluminum, aluminum alloys, copper, zinc, stainless steel, vanadium, molybdenum, chromium, titanium, nickel, indium, gold, platinum, etc., and otherwise plastics having coatings formed by vacuum vapor deposition method of aluminum, aluminum alloys, indium oxide, tin oxide, indium oxide-tin oxide alloy, etc., substrates having electroconductive particles (e.g. carbon black, silver particles, etc.) coated together with a suitable binder on a metal and a plastic as the priming layer, substrates of plastics or papers impregnated with electroconductive particles, plastics having an electroconductive polymer, etc.

In the present invention, for forming a layer such as a under coating layer, an intermediate layer, a photosensitive layer, there can be employed coating methods such as dip coating, spray coating, spinner coating, bead coating, Meyer bar coating, blade coating, roller coating, curtain coating, etc. An intermediate layer may be also provided between the substrate and the photosensitive layer.

As the intermediate layer to be used in the present invention, it is demanded to be capable of impeding injection of carriers (charges) from the electroconductive substrate to the photosensitive layer, and have an electrical resistance of 1/50 or less as compared with the photosensitive layer. Generally speaking, preferable materials have high electrical resistance, and therefore the film thickness may be appropriately 5 μm or less, preferably 0.1 to 2 μm.

As the material to be used for the intermediate layer, there may be included, casein, gelatin, polyamide (nylon 6, nylon 66, nylon 610, copolymer nylon, alkoxymethylated nylon), polyurethane, polyvinyl alcohol, nitrocellulose, ethylene-acrylic acid copolymer, phenol resin, acryl, polyester, polyether.

A charge generation material which is dispersed in the appropriate binder resin can be coated to form a film. Also, as the charge generation substance to be used in the present invention, even a dye soluble in a solvent can be also used by forming into particles by selecting the solvent. Further, a charge generation substance can be coated according to vapor deposition, sputtering, CVD method, etc., but they are frequently used as dispersed in fine particles in a binder of a polymer.

The charge generation substance to be used in the present invention is primarily an organic compound, but an inorganic material such as a-Se, a-Si, CdS, Si-Te, etc. may be also employed.

The charge generation substance to be used in the present invention may include phthalocyanine type pigments, anthanthrone pigments, dibenzpyrene pigments, trisazo pigments, disazo pigments, azo pigments, indigo pigments, quinacridone type pigments, cyanine type pigments, squarilium type pigments, azulenium salt compounds, pyrilium, thiopyrilium type dyes, xanthene type dyes, quinoneimine type dyes, triphenylmethane type dyes, styryl type dyes, etc.

A charge transport material which is dispersed in the appropriate binder resin can be coated to form a film.

The charge transport material to be used in the present invention may include, for example, the organic photoconductive materials shown in Table 1.

TABLE 1

| Exemplary Compounds | Structural Formula |
|---|---|
| 1 | 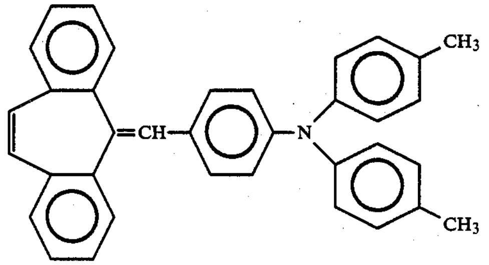 |

TABLE 1-continued
| Exemplary Compounds | Structural Formula |
| --- | --- |
| 2 | 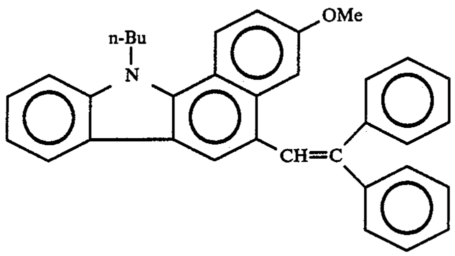 |
| 3 | 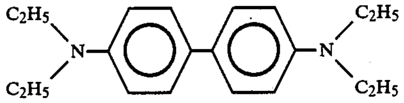 |
| 4 | 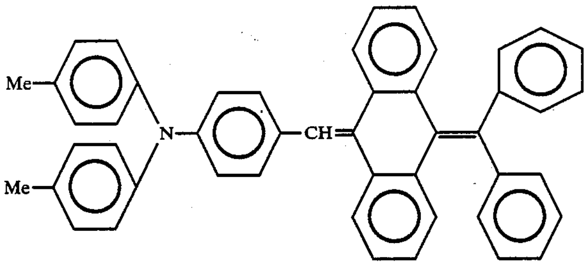 |
| 5 | 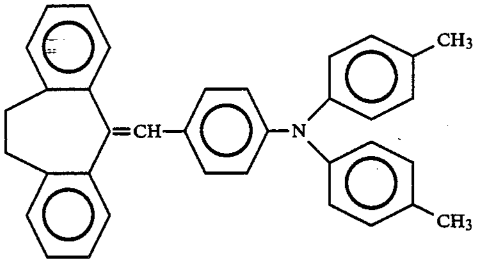 |
| 6 | 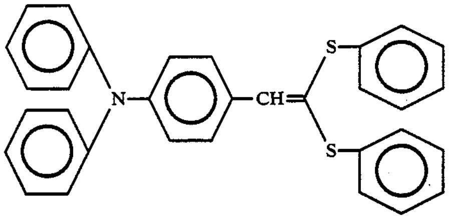 |
| 7 | 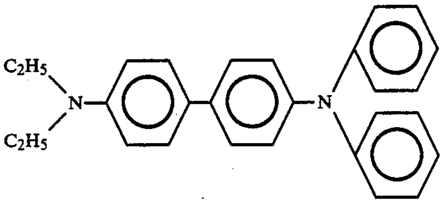 |

TABLE 1-continued

| Exemplary Compounds | Structural Formula |
|---|---|
| 8 | 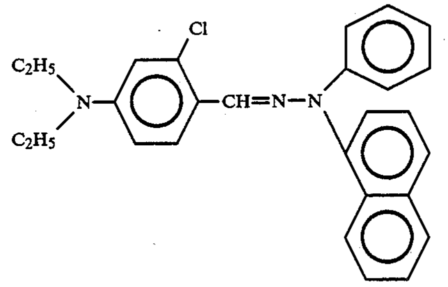 |

The common feature of these substances, although not yet clarified, appears to be generally substances of high basicity which are excellent in nitric acid resistance. However, under the present invention, there is no distinct measure for evaluation of basicity.

For obtaining a surface layer containing a charge transport material excellent in nitric acid resistance, other than using the charge transport material excellent in nitric acid resistance as described above, it may be considered to employ the method such as making the formulation ratio of the charge transport material to the binder resin smaller (to decrease the charge transport material), or adding a donor substance, etc. to said surface layer, etc.

Examples of the binder resin to be used in the present invention may include polyarylate resin, polysulfone resin, polyamide resin, acrylic resin, acrylronitrile resin, methacrylic resin, vinyl chloride resin, vinyl acetate resin, phenol resin, epoxy resin, polyester resin, alkyd resin, polycarbonate, polyurethane or copolymer resins containing two or more of the recurring units of these resins, such as styrene-butadiene copolymer, styrene-acrylonitrile copolymer, styrene-maleic acid copolymer, etc.

The film thickness of the photosensitive layer may be 5 to 50 μm, preferably 10 to 30 μm, but in the case of the function separation type to be laminated in the order of a charge generation layer, a charge transport layer, the thickness of a charge generation layer may be properly 0.01 to 5 μm (particularly 0.05 to 3 μm), and that of a charge transport layer 5 to 50 μm (particularly 10 to 30 μm).

Also, in the upper most layer, a lubricating substance, A UV-ray absorber, an antioxidant, etc. may be also contained.

EXAMPLE 1

100 parts by weight of electroconductive titanium oxide powder (produced by Titan Kogyo), 100 parts by weight of titanium oxide powder (produced by Sakai Kogyo), 125 parts by weight of a phenol resin (Plyophen, produced by Dainippon Ink Co.), and 20 parts by weight of spherical silicone resin fine powder (polymethylsilsesquioxane, specific gravity 1.3, average particle size 1.2 μ) were mixed in solvents of 50 parts by weight of methanol and 50 parts by weight of methyl cellusolve, and then the mixture was dispersed by means of a sand mill over 6 hours. The dispersion was applied by the dipping method on an aluminum cylinder of 80φ×360 mm, and thermally cured at 150° C. for 30 minutes to provide a priming layer with a film thickness of 20 μm. Next, 2 parts by weight of a copolymer nylon resin (trade name: Amilan CM 8000, produced by Toray) and 8 parts by weight of a copolymer nylon resin (trade name: Toresin EF-30T, produced by Teikoku Kagaku) were dissolved in a mixture of 60 parts by weight of methanol and 40 parts by weight of butanol, and the solution was applied by dipping on the above priming layer to provide an intermediate layer with a thickness of 1 μm.

Next, 10 parts by weight of a disazo pigment having the formula shown below:

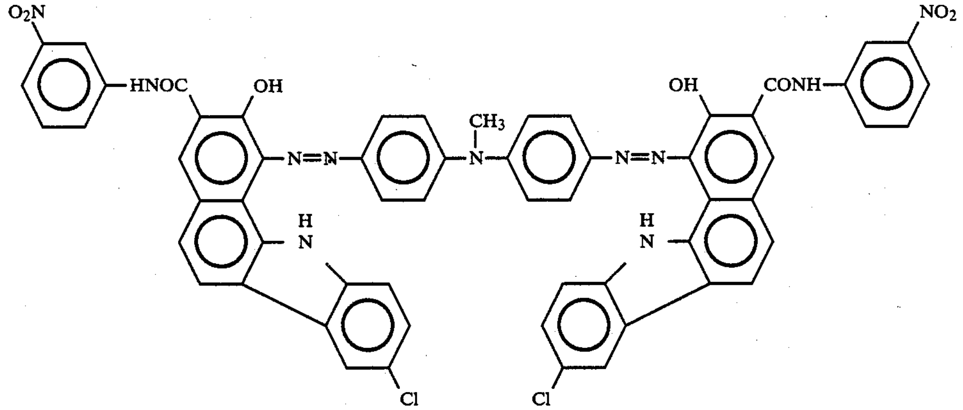

6 parts by weight of an acrylic resin (Dianal BR-80, produced by Mitsubishi Rayon) as the charge generation substance and 60 parts by weight of cyclohexanone were dispersed by means of a sand mill device by use of 1 φ glass beads for 30 hours. To this dispersion were added 270 parts by weight of methyl ethyl ketone, and the solution was applied by dipping on the above intermediate layer, followed by drying at 50° C. for 10 minutes to provide a charge generation layer with a coated amount of 0.15 $g/m^2$.

Subsequently, 10 parts by weight of the exemplary compound No. 1 shown in the above Table 1 and 10 parts by weight of a polycarbonate resin (trade name: Panlite K-1300, Teijin Kasei K.K.) were dissolved in 80 parts by weight of dichloromethane. The solution was applied by dipping on the above charge generation layer, followed by hot air drying at 120° C. for 1 hour to form a charge transport layer with a thickness of 20 μm, thus preparing an electrophotographic photosensitive member.

Also, by use of the exemplary compounds No. 9, 10 in Table 2, in place of the above exemplary compound No. 1, according to entirely the same procedure, a photosensitive member of Comparative Examples 1, 2 were prepared.

TABLE 2

| Exemplary Compounds | Structural Formula |
|---|---|
| 9 | 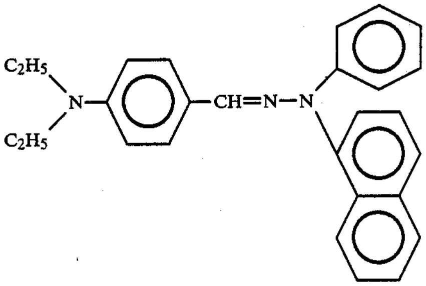 |
| 10 | 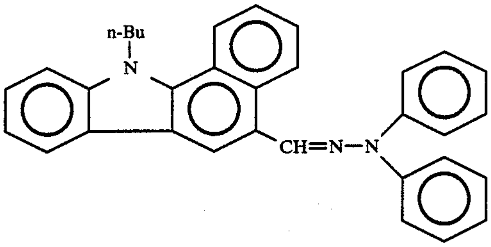 |
| 11 | 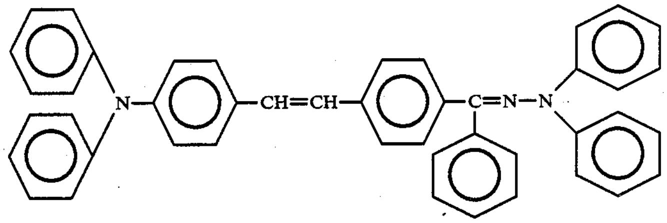 |
| 12 | 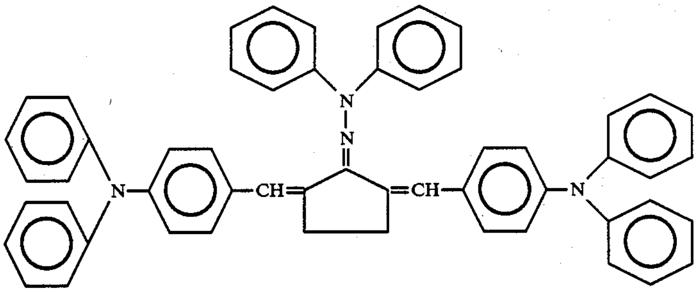 |
| 13 | 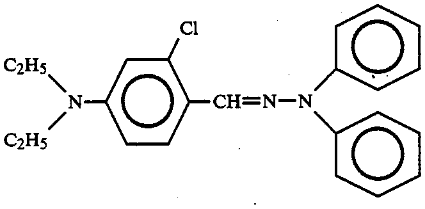 |

TABLE 2-continued

| Exemplary Compounds | Structural Formula |
| --- | --- |
| | |

For the photosensitive drums prepared as described above, investigations concerning image white drop-out were conducted by use of a laser electrophotographic device as described below.

Device A

Figure 9A:
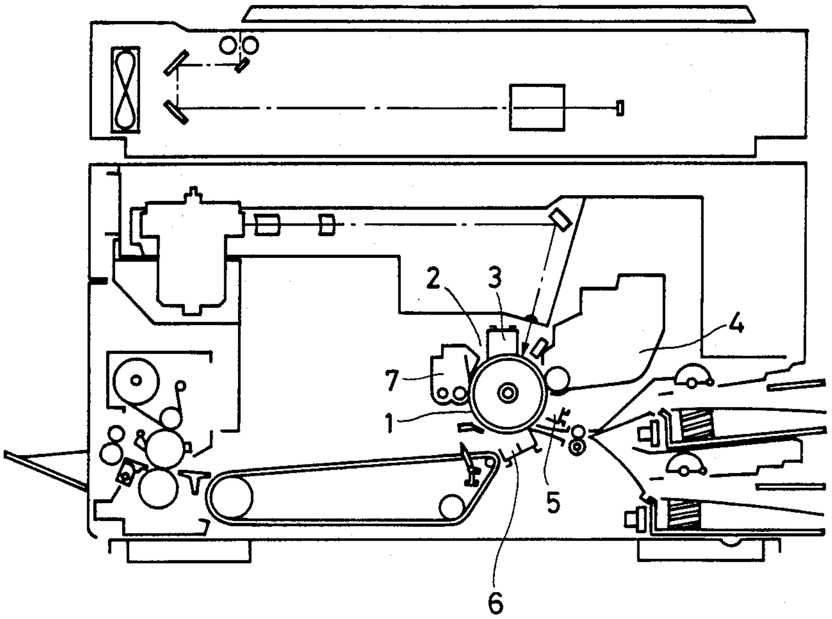
FIG. 9A illustrates schematically laser copying machine, FIG. 9B a scanninig optical system.

The outline of the device is shown in FIG. 9A. This device is a laser copying machine capable of reproducing half tone. As the light source, a semiconductor laser with a wavelength of 775 nm is used and spot diameter of the laser beam is made variable.

The basic process comprises repetition of an image exposure by primary charging laser 3 according to minus corona discharging, reversal development 4 according to the jumping system with a negative tone, transfer 6 by plus corona discharging, cleaning 7 with a blade and erasing 2 of the residual potential by the whole surface exposure.

Figure 9B:
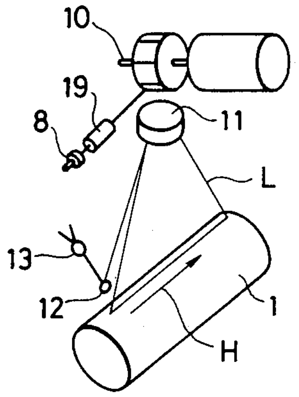

A scan optical type (FIG. 9B) has semiconductor laser 8 for irradiating modulated laser beam. Light beam modulated by semiconductor laser 8 is collimated by collimate lens 9 and polarized by rotational polygon mirror having plural reflective surfaces. The polarized light beam after going through $f\theta$ lens 11 is beamed to make an image on photoconductive drum 1, and conducts beam. In the beam scan, the tip of 1 line scan of the light beam is reflected by mirror 12 to lead light to beam director 13.

The laser exposure conditions were made so as to make the spot diameter/dot number variable to combinations of (1) 120 $\mu$/240 dpi, (2) 80 $\mu$/300 dpi, (3) 70 $\mu$/300 dpi, (4) 60 $\mu$/400 dpi. Reproduction of half tone is effected by the change in dot number.

Device B

This is a laser copying machine similar to the Device A, but further improved in image quality by effecting reproduction of half tone by changing the laser dose at the four stages of 2.8 $\mu J/cm^2$, 2.0 $\mu m/cm^2$, 1.0 $\mu J/cm^2$ and OFF. Ths laser spot diameter of this device is 70 $\mu$.

Device C

The basic constitution is the same as the device A, and however, reproduction of half tone by pulse width change of laser beam. The pulse time is varied from 15 to 24 ns.

Device D

The basic constitution is substantially the same as the device C, and half tone is reproduced by pulse width modulation of laser beam.

However, it is a device for performing color copying in which a manuscript is spectralized with a filter, latent image formation, developing, transfer are repeated for the respective colors (yellow, cyan, magenta, black) and finally fixing is effected by hot rolls.

The transfer step is characterized in that a transfer paper is wound on a transfer drum and transfer is effected by synchronizing constantly the position of the photosensitive drum with the tip end of the copying paper.

The photosensitive members of Example 1 and Comparative Examples 1, 2 were each mounted on the Device A, and continuous copying of 1000 sheets and 3000 sheets was conducted in an atmosphere of 30° C., 80% RH, and left to stand as such for 15 hours to copy the half tone image on the whole A3 surface. The results are shown in the following Table. At this time, the conditions (1)–(4) of the spot diameter/dot number as mentioned above were employed.

| Spot diameter/ dot numbers | Example 1 1,000 sheets | Example 1 3,000 sheets | Comparative Example 1 1,000 sheets | Comparative Example 1 3,000 sheets | Comparative Example 2 1,000 sheets | Comparative Example 2 3,000 sheets |
| --- | --- | --- | --- | --- | --- | --- |
| (1) 120 $\mu$/240 dpi | ○ (no abnormality) | | ○ | | ○ | |
| 80 $\mu$/300 dpi | ↑ | | Δ | X generation of white drop-out | ○ | Δ generation of slight white drop-out |
| (3) 70 $\mu$/300 dpi | ↑ | | ○ | X | ○ | X |
| (4) 60 $\mu$/400 dpi | ↑ | | ○ | X | ○ | X |
| nitric acid resistance (absorption end shift) | 0 nm | | 75 nm | | 60 nm | |

As can be seen from the above results, Comparative examples 1, 2 are low in nitric acid resistance of the charge transport layer, and image white drop-out is generated slightly when the spot diameter of laser becomes 100 $\mu m$ or smaller. Further, when the spot diameter becomes 70 $\mu m$ or smaller, image white drop-out becomes further marked. Also, while there was no problem at the time of copying 1000 sheets, but abnormality was generated at the time of 3000 sheets.

On the other hand, the photosensitive member of this Example is excellent in nitric acid resistance of the charge transport layer (the absorption end is not substantially changed), and also no image white drop-out is generated even under the condition of small spot diameter, with durability being also good. From these results, it can be understood that the basic cause for image white drop-out resided in difference between the charge transport materials (to say further, difference in $HNO_3$ resistance).

Next, the same samples were investigated by applying for various machines of Devices A–D. And, after continuous copying, intermission was done for 1 hour, and half tone copy of whole surface was conducted for examination of the extent of image white drop-out depending on the element of the device.

| Apparatus | Example 1 | | | | Comparative Example 1 | | | |
|---|---|---|---|---|---|---|---|---|
| | 100 sheets | 500 sheets | 1,000 sheets | 3,000 sheets | 100 sheets | 500 sheets | 1,000 sheets | 3,000 sheets |
| A 70 μ/300 dpi | ○ | ○ | ○ | ○ | ○ | ○ | Δ | X |
| B 70 μ/300 dpi 1.0 μJ/cm² | ○ | ○ | ○ | ○ | ○ | Δ | Δ | X |
| C PWM system Monocolor copy | ○ | ○ | ○ | ○ | Δ | X | X | X |
| D PWM system Four color copy (half tone of the same color on the whole surface) | ○ | ○ | ○ | ○ | X | X | X | X |

From the above results, it can be understood that the image white drop-out is more severe in the order of Device A to device D in the prior art examples. Among them, it can be understood that latent image formation by laser exposure according to PWM system, further full color of 4 colors is severest.

Also, in $HNO_3$ exposure test, Example 1 substantially unchanged in the absorption end did not generate image white drop-out even in devices C, D of the most severest PWM system. On the other hand, Comparative examples 1, 2 exhibited great shifts of absorption ends as 75 nm, 40 nm, respectively, also in $HNO_3$ exposure test, and particularly in Devices C, D of PWM system, it was found that image white drop-out occurred even after continuous copying of about 100 sheets.

Figure 5A:
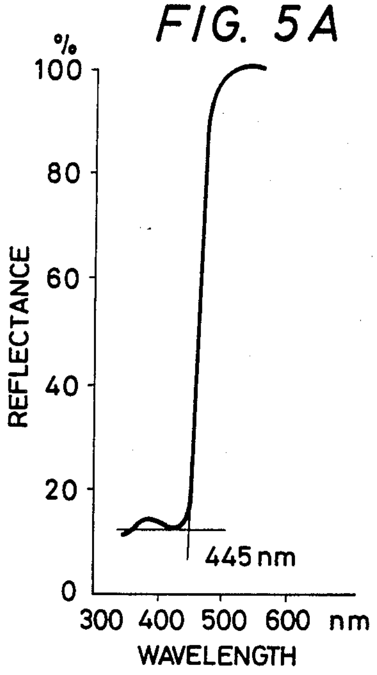
FIGS. 5A through 8B are examples of spectroscopic reflectance of the surface layer, FIGS. 5A, 6A, 7A and 8A showing those before nitric acid exposure and 5B, 6B, 7B and 8B showing those after $HNO_3$ nitric acid exposure. The numerals in the figures represent absorption ends of spectroscopic absorption determined by figure drawing.
Figure 5B:
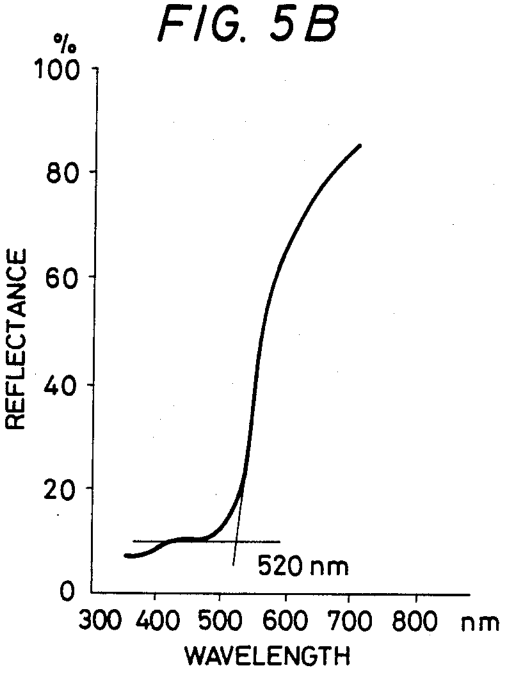
Figure 6A:
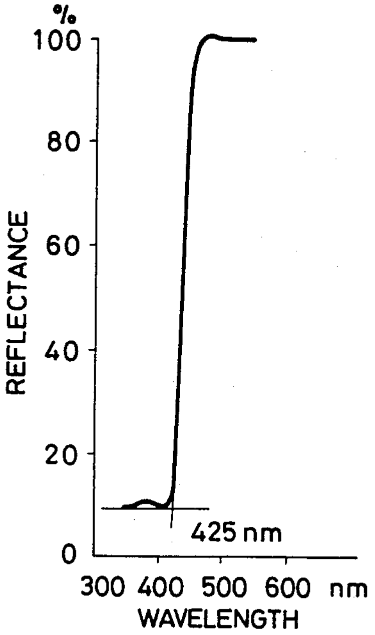
Figure 6B:
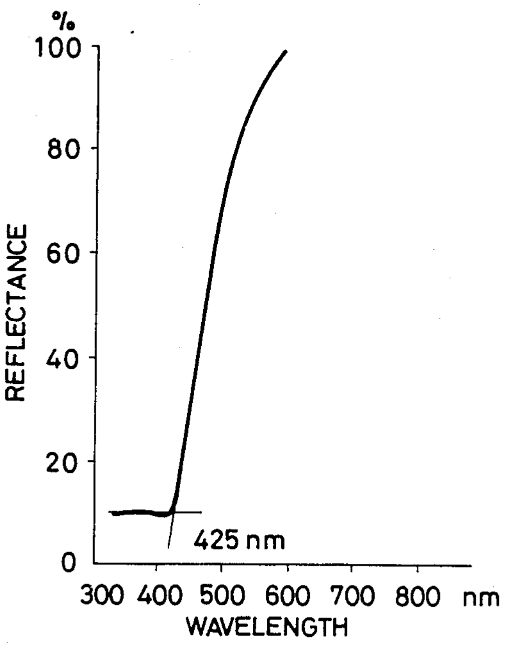

The changes in spectroscopic reflectance before and after $HNO_3$ exposure test are shown in FIGS. 5A and 5B (Comparative example 1) and FIGS. 6A and 6B (Example 1).

EXAMPLES 2-5

In these respective Examples, electrophotographic photosensitive members were prepared according to the same method as in Example 1 except for using the substances shown below in place of the charge generation substance used in the above Example 1 and the exemplary compounds No. 2-No. 5 in place of the charge transport compound No. 1. Table 3 shows the combinations of charge generation material and charge transport material in Examples 2-5.

TABLE 3

| Examples | Charge generation substances | Charge transport compounds Exemplary compounds |
|---|---|---|
| 2 | 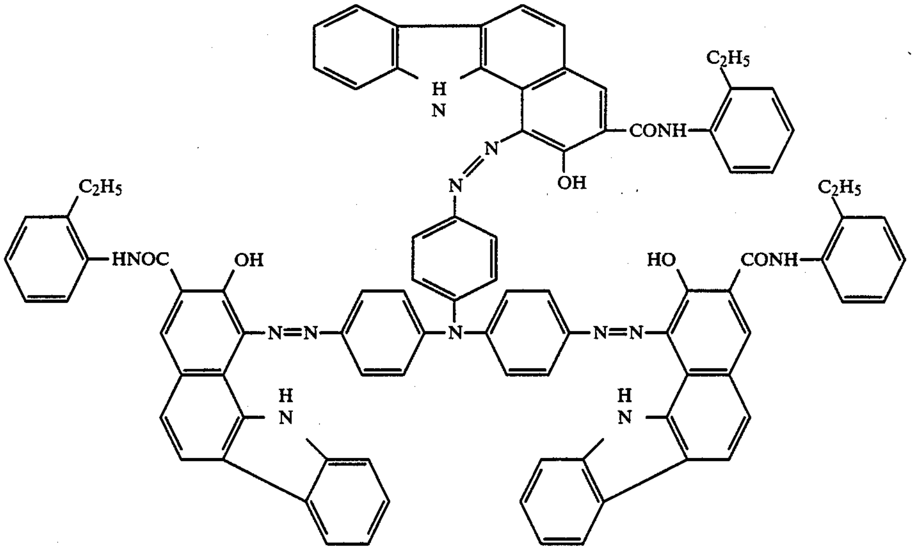 | 2 |

TABLE 3-continued

| Examples | Charge generation substances | Charge transport compounds Exemplary compounds |
|---|---|---|
| 3 | 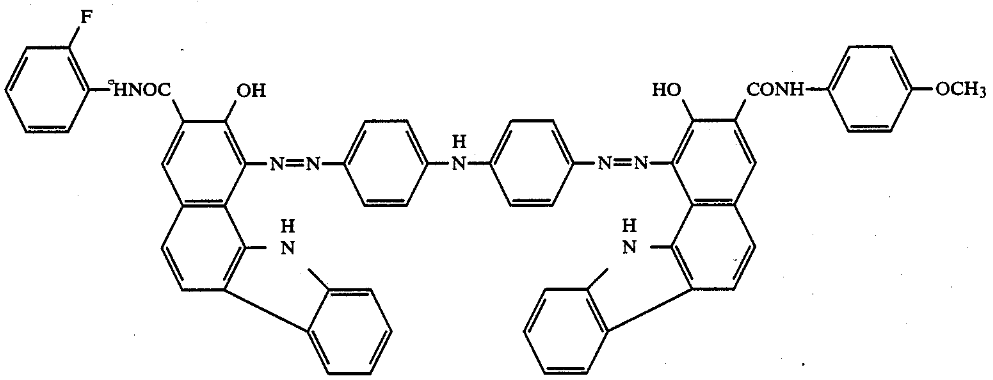 | 3 |
| 4 | β type copper phthalocyanine | 4 |
| 5 | 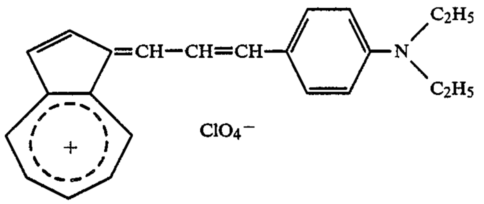 | 5 |

For comparison, the exemplary compound 2 of Example 2 was replaced with the exemplary compounds No. 11, 12 in Table 2, to prepare Comparative Examples 3,4.

The above photosensitive members were each set in Device D, and continuous copying was performed, and after intermission for 15 hours, image white drop-out of half tone was investigated.

| Sample | $HNO_3$ resistances | Image white drop-out: after copying of 100 sheets | 500 sheets | 1,000 sheets |
|---|---|---|---|---|
| Example 2 | 5 nm | ○ | ○ | ○ |
| Example 3 | 40 nm | ○ | ○ | ○Δ |
| Example 4 | 30 nm | ○ | ○ | ○ |
| Example 5 | 15 nm | ○ | ○ | ○ |
| Comparative Example 3 | 45 nm | ○ | Δ | X |
| Comparative Example 4 | 70 nm | X | X | X |

As can be seen from the above results, in a photosensitive member in which a charge transport layer weak to surface $HNO_3$ exposure ($HNO_3$ resistance: absorption end shift 45 nm or higher) is used, image white drop-out is marked, while in a photosensitive member by use of a charge transport layer strong to $HNO_3$ exposure ($HNO_3$ resistance: absorption end shift 40 nm or less), no image white drop-out was found to be generated.

In the case of a photosensitive member with the absorption end shift of 40 nm, image white drop-out was found to be slightly generated after intermission for 15 hours after continuous copying of 1000 sheets, which was at a level with no practical problem.

Figure 7A:
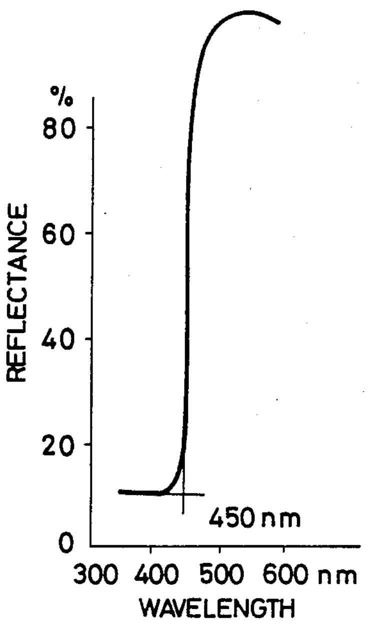
Figure 7B:
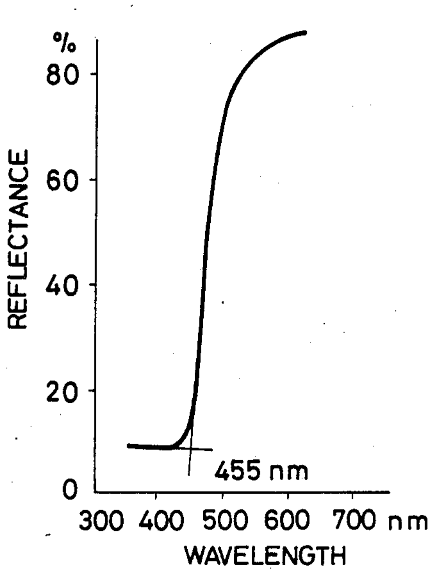
Figure 8A:
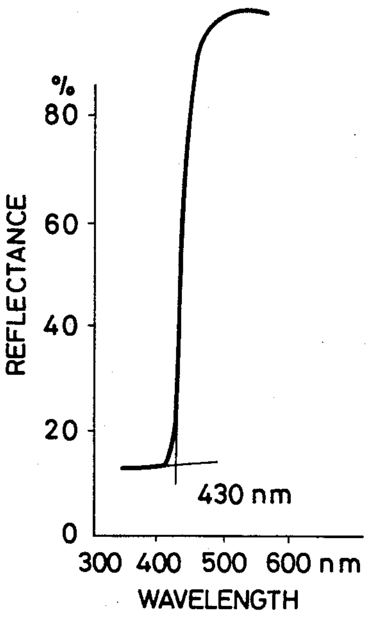
Figure 8B:
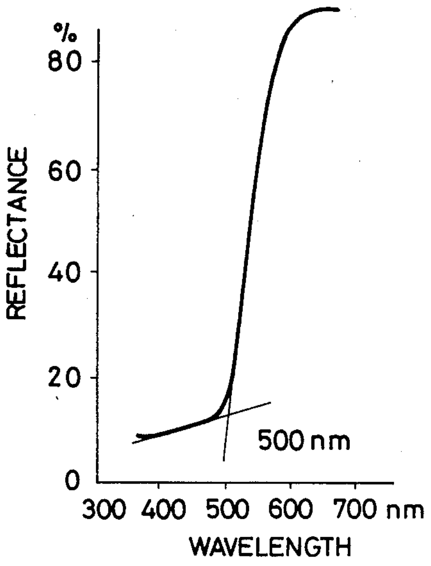

The changes in absorption end are shown in the Table, and the data of spectroscopic reflectance in the case of Example 2 are shown in FIG. 7 and those in the case of Comparative example 4 in FIG. 8.

EXAMPLE 6

An electrophotographic photosensitive member was prepared according to the same procedure as in Comparative example 2 except for changing 10 parts by weight of the compound No. 10 to 4 parts by weight.

In the case of Comparative example 2 (10 parts by weight of the compound No. 10), the change in the absorption end wavelength was 60 nm, while the change in the absorption end wavelength was found to be 40 nm when the amount was changed to 4 parts by weight.

The results when image white drop-out was investigated by use of Device D for the photosensitive member are shown in the following Table.

| | Charge Transporting material/binder ratio | Charge of absorption end | Image white drop-out: 100 sheets | 500 sheets | 1000 sheets |
|---|---|---|---|---|---|
| Example 6 | 4/10 | 40 nm | ○ | ○ | ○Δ |
| Comparative | 10/10 | 60 nm | Δ | X | X |

-continued

| | Charge Transporting material/ binder ratio | Charge of absorption end | Image white drop-out 100 sheets | 500 sheets | 1000 sheets |
|---|---|---|---|---|---|
| Example 2 | | | | | |

As the result, it can be understood that image white drop-out is also concerned with the composition of the charge transport layer. It can be understood that $HNO_3$ resistance becomes more excellent as the charge transport material/binder resin ratio is smaller, whereby image white drop-out is also generated with difficulty.

EXAMPLE 7

An aluminum cylinder of 80ϕ×360 nm was fixed at a predetermined position of a glow discharging vapor deposition tank. Next, the tank was internally evacuated to a vacuum degree of about $5\times10^{-6}$ torr. The input voltage of the heater was thereafter elevated to stabilize the molybdenum substrate temperture to 150° C. Then, hydrogen gas and silane gas (15% by vol. based on hydrogen gas) were introduced into the tank, and the pressure was stabilized to 0.5 torr by controlling the gas flow rates and the main valve of the vapor deposition tank. Next, a high frequency power of 5 MHz of induction coil was thrown to excite glow discharging within the coil in the tank to give an input power of 30 W. An amorphous silicon film was grown on the substrate under the above conditions, and the same conditions were maintained until the film thickness became 2 μm, followed by intermission of glow discharging. Then, with the heater, the high frequency power source being made off-state, and waiting for the substrate temperture to become 100° C., the outflow valves of hydrogen gas, silane gas were closed to evacuate one the tank internally to $10^{-5}$ torr, and then the tank was returned to atmospheric, whereupon the substrate was taken out. Subsequently, a charge transport layer was formed in entirely the same manner as in Example 1 except for using the exemplary compound No. 3 as the charge transport material.

Also, as Comparative example 5, except for changing the charge transport material in Example 7 to the compound of No. 13, a photosensitive member drum was prepared in entirely the same manner as in Example 7.

After continuous copying of 500 sheets by use of Device C, intermission was done for 15 hours and thereafter image formation of intermediate tone was effected. As the result, in Comparative example 5, a band-shaped white drop-out was found to be generated on the image corresponding to the site of the photosensitive member which stood stationarily under the charger.

On the other hand, a homogeneous image of half tone without defect at all could be obtained in Example 5.

EXAMPLE 8

According to the same method as in Example 1, priming layer and intermediate layer were formed.

Next, 10 parts by weight of the exemplary compound and 10 parts by weight of a polycarbonate resin (trade name: Panlite L-1250, Teijin Kasei K.K.) were dissolved in 80 parts by weight of dichloromethane. The solution was applied by dipping on the above intermediate layer, followed by hot air drying at 110° C. for 1 hour, to form a change transport layer with a thickness of 20 μm. Next, 2 parts by weight of a charge generation substance having the formula shown below:

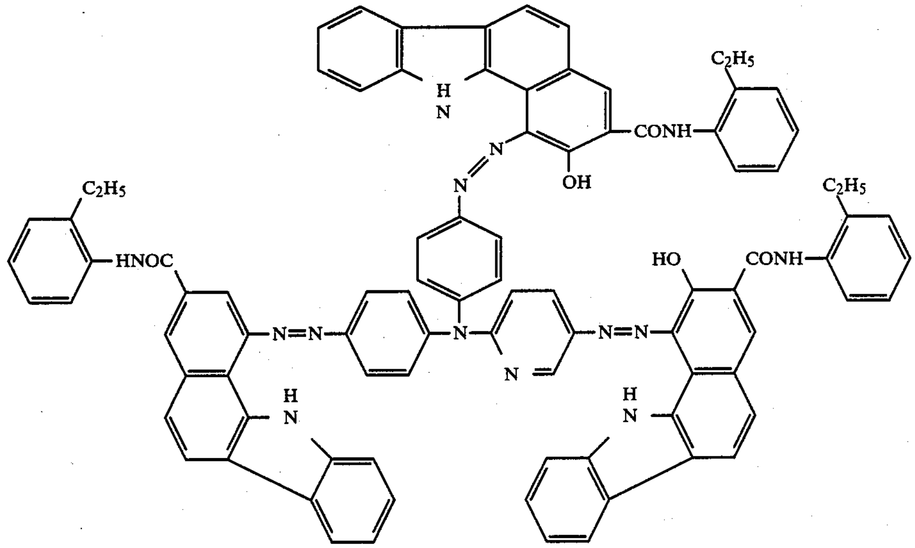

10 parts by weight of the exemplary compound No. 2, 10 parts by weight of a polycarbonate resin (trade name: Panlite L-1250, Teijin Kasei K.K.) and 180 parts by weight of dichloromethane were dispersed by means of a sand mill device using 1ϕ glass beads. The disperseion was spray dried on the above charge transport layer, and dried by heating at 110° C. for 30 minutes to form a charge generation layer with a thickness of 5 μm, thus providing an electrophotographic photosensitive member. Absorption end shift by nitric acid exposure was 5 nm.

As Comparative example 6, except for using the compound No. 9 in Table 2 as the charge transport material contained in the charge generation layer, a photosensitive drum was prepared in entirely the same manner as in Example 8. Absorption end shift by nitric acid exposure was 75 nm.

With the polarity of the transfer charger being opposite to that of the primary charger in Device D, according to the method of 15 hours' intermission after continuous copying of 500 sheets, image white drop-out of half tone was evaluated.

As the result, although image white drop-out with charger width was generated in Comparative example 6, there was no problem at all in Example 8.

We claim:

1. An electrophotographic apparatus comprising at least a charging means, an imagewise exposure means with a laser beam having a spot diameter of 100 μm or less, a developing means, a transferring means and a cleaning means arranged around an electrophotographic photosensitive member, said electrophotographic photosensitive member comprising a charge generation material and a charge transport material comprising an organic photoconductive material and having a surface layer containing said charge transport material, wherein the absorption end of visible to UV spectroscopic absorption of the surface layer is substantially unchanged by exposure to nitric acid vapor for 10 minutes.

2. An electrophotographic apparatus according to claim 1, wherein the image exposure means is capable of varying the laser pulse width.

3. An electrophotographic apparatus according to claim 1, wherein the image exposure means is capable of varying the quantity of the laser beam in two stages or more.

4. An electrophotographic apparatus according to claim 1, wherein the developing means comprises at least three color toners to perform copying of a color image.

5. An electrophotographic apparatus according to claim 1, wherein the apparatus can reproduce half tone.

6. An electrophotographic apparatus according to claim 1, wherein the photosensitive member has a structure comprising a charge generation layer containing a charge generation material and a charge transport layer containing a charge transport material successively laminated on an electroconductive substrate.

7. An electrophotographic apparatus according to claim 1, wherein the change in the absorption end by exposure to nitric acid vapor is 40 nm or less.

8. An electrophotographic apparatus according to claim 1, wherein change in the absorption end by exposure to nitric acid vapor is 30 nm or less.

9. An electrophotographic apparatus according to claim 1, where the spot diameter of the laser beam is 70 μm or less.

* * * * *

UNITED STATES PATENT AND TRADEMARK OFFICE

CERTIFICATE OF CORRECTION

PATENT NO. : 4,910,536

DATED : March 20, 1990

INVENTOR(S) : NAOTO FUJIMURA, ET AL.

It is certified that error appears in the above-identified patent and that said Letters Patent is hereby corrected as shown below:

IN [57] ABSTRACT

Line 3, "100 um" should read --100 μm--.

COLUMN 1

Line 13, "so called" should read --so-called--.
Line 39, "so called" should read --so-called--.
Line 42, "not" should read --now--.

COLUMN 2

Line 48, "a" should be deleted.
Line 60, "have" should read --having--.

COLUMN 3

Line 24, "member" should read --members--.

COLUMN 4

Line 36, "a" (second occurrence) should be deleted.
Line 47, "represents" should read --represent--.
Line 68, "scanninig" should read --scanning--.

COLUMN 6

Line 33, "in" (second occurrence) should be deleted.
Line 62, "spectorophotometer," should read --spectrophotometer,--.

UNITED STATES PATENT AND TRADEMARK OFFICE

CERTIFICATE OF CORRECTION

PATENT NO. : 4,910,536

DATED : March 20, 1990

INVENTOR(S) : NAOTO FUJIMURA, ET AL.

It is certified that error appears in the above-identified patent and that said Letters Patent is hereby corrected as shown below:

COLUMN 7

Line 30, "referrs" should read --refers--.

COLUMN 15

Line 21, "tone," should read --toner,--.
Line 62, "Ths" should read --The--.
Line 66, "and however," should read --except for--.

COLUMN 16

Table, "80 μ/300 dpi" should read --(2) 80 μ/300 dpi--.
Line 54, "but" should be deleted.

COLUMN 17

Line 26, "device D" should read --Device D--.
Line 32, "most sever-" should read --most severe--.
Line 33, "est" should be deleted.

COLUMN 21

Line 8, "the" should read --a--.
Line 60, "evacuate one" should read --first evacuate--.

COLUMN 22

Line 60, "disperseion" should read --dispersion--.

UNITED STATES PATENT AND TRADEMARK OFFICE

CERTIFICATE OF CORRECTION

PATENT NO. : 4,910,536

DATED : March 20, 1990

INVENTOR(S) : NAOTO FUJIMURA, ET AL. Page 3 of 3

It is certified that error appears in the above-identified patent and that said Letters Patent is hereby corrected as shown below:

COLUMN 23

Line 10, "the" should read --a--.

Signed and Sealed this

Twentieth Day of August, 1991

*Attest:*

HARRY F. MANBECK, JR.

*Attesting Officer*

*Commissioner of Patents and Trademarks*